US009615198B2

(12) United States Patent
Wirola et al.

(10) Patent No.: US 9,615,198 B2
(45) Date of Patent: Apr. 4, 2017

(54) PROPRIETARY EXTENSIONS IN USER PLANE LOCATION PROTOCOLS

(75) Inventors: Lauri Wirola, Tampere (FI); Ismo Halivaara, Tampere (FI); Jari Syrjarinne, Tampere (FI)

(73) Assignee: Nokia Technologies Oy, Espoo (FI)

( * ) Notice: Subject to any disclaimer, the term of this patent is extended or adjusted under 35 U.S.C. 154(b) by 29 days.

(21) Appl. No.: 13/133,097

(22) PCT Filed: Dec. 4, 2009

(86) PCT No.: PCT/FI2009/050981
§ 371 (c)(1),
(2), (4) Date: Jun. 6, 2011

(87) PCT Pub. No.: WO2010/063891
PCT Pub. Date: Jun. 10, 2010

(65) Prior Publication Data
US 2011/0235655 A1    Sep. 29, 2011

Related U.S. Application Data (60) Provisional application No. 61/120,040, filed on Dec. 4, 2008.

(51) Int. Cl.
*H04W 4/02* (2009.01)
*G01S 19/05* (2010.01)
(Continued)

(52) U.S. Cl.
CPC .............. *H04W 4/02* (2013.01); *G01S 19/05* (2013.01); *H04L 67/02* (2013.01); *H04L 67/18* (2013.01); CPC ......... *H04L 69/22* (2013.01); *H04W 4/20* (2013.01); *G01S 19/07* (2013.01)

(58) Field of Classification Search
None
See application file for complete search history.

(56) References Cited

U.S. PATENT DOCUMENTS 6,990,086 B1    1/2006 Holur et al. ................. 370/329
7,443,824 B1 *  10/2008 Lipford et al. ............... 370/338
(Continued)

FOREIGN PATENT DOCUMENTS

EP    1865688 A1    12/2007
WO    9966749 A1    12/1999
(Continued)

OTHER PUBLICATIONS

International Search Report and Written Opinion of the International Searching Authority for corresponding Patent Cooperation Treaty Application No. PCT/FI2009/050981 dated Mar. 23, 2010, 13 pages.
(Continued)

*Primary Examiner* — Yemane Mesfin
*Assistant Examiner* — Peter Chen
(74) *Attorney, Agent, or Firm* — Harrington & Smith (57) ABSTRACT

Systems and methods are provided allowing for a vendor-defined payload in a standardized user-plane location solution/protocol, where proprietary extension support is introduced into one or more standardized solutions. In accordance with a first embodiment, a location payload consists of structures for transferring requests, assistance data, measurements and positioning instructions. Therefore, a proprietary extension is included in each of these structures so that, for example, proprietary assistance data can be requested in an appropriate structure. In accordance with another embodiment, a proprietary extension is introduced at the highest abstraction level. For example and in an actual implementation, a vendor can define that in the beginning of the proprietary payload, the proprietary extension is defined, whether the proprietary payload contains a request, assistance, etc.

19 Claims, 6 Drawing Sheets

(51) Int. Cl.
*H04W 4/20* (2009.01)
*H04L 29/08* (2006.01)
*H04L 29/06* (2006.01)
*G01S 19/07* (2010.01)

(56) References Cited

U.S. PATENT DOCUMENTS

2002/0006133 A1* 1/2002 Kakemizu et al. ........... 370/401
2003/0204627 A1* 10/2003 Mizell et al. ................. 709/245
2005/0153706 A1 7/2005 Niemenmaa et al.
2007/0121560 A1* 5/2007 Edge ............................ 370/338
2008/0273485 A1* 11/2008 Tsigler et al. ................ 370/328
2009/0298512 A1* 12/2009 Chen et al. ................ 455/456.1

FOREIGN PATENT DOCUMENTS

| WO | WO-00/78008 A1 | 12/2000 |
| WO | 03045084 A2 | 5/2003 |
| WO | 2007056738 A2 | 5/2007 |
| WO | WO-2007/056738 A2 | 5/2007 |
| WO | 2008093998 A1 | 8/2008 |

OTHER PUBLICATIONS

Office Action received for corresponding Canadian Application No. 2,745,485, dated Jul. 23, 2013, 3 pages.

Supplemental European Search Report and Written Opinion received for corresponding European Application No. EP 09 83 0065, dated Mar. 19, 2012, 6 pages.

OMA: "OMA Management Object for SUPL Candidate Version 2.0", OMA-TS-SUPL_MP-V2_0-20080627-C, Jun. 27, 2008, pp. 1-12, XP002671720, URL: http://member.openmobilealliance.org/ftp/Public_documents/LOC/Permanent_documents/.

OMA: "Secure User Plane Location Requirements Candidate Version 2.0", OMA-RD-SUPL-V2_0-20080627-C, Jun. 27, 2008, pp. 1-33, XP002671721. URL: http://member.openmobilealliance.org/ftp/Public_documents/LOC/Permanent_documents/.

* cited by examiner

PROPRIETARY EXTENSIONS IN USER PLANE LOCATION PROTOCOLS

RELATED APPLICATION

This application was originally filed as PCT Application No. PCT/FI2009/050981, filed Dec. 4, 2009, which claims priority benefit from U.S. Provisional Patent Application No. 61/120,040, filed Dec. 4, 2008.

FIELD

Various embodiments relate generally to positioning technologies for location-based services. More particularly, various embodiments relate to providing a vendor-defined payload in a standardized user-plane location solution to location-based services.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Location services based on the location of mobile devices are becoming increasingly widespread. Assistance data for assisted navigation systems, such as GNSS, have been specified and standardized for cellular systems, e.g., global positioning systems (GPS), European Galileo, and Russian Global Navigation Satellite System (GLONASS). An exemplary GNSS can comprise a network of satellites that broadcasts navigation signals including time and distance data. GNSS receivers pick up these broadcasted navigation signals and calculate a precise global location based thereon. Other examples of GNSS include, but are not limited to, satellite-based augmentation systems (SBAS), local area augmentation systems (LAAS), quasi-zenith satellite systems (QZSS), and hybrid receivers.

The delivery of such assistance data can be built on top of cellular system-specific control plane protocols including, e.g., the radio resource location services protocol (RRLP) for GSM networks, the radio resource control (RRC) protocol of layer 3 in wideband code division multiple access (WCDMA) networks, and IS-801 for Code Division Multiple Access (CDMA) networks, standardized in the $3^{rd}$ Generation Partnership Project (3GPP) and 3GPP2 standards. In addition, the control plane protocols also support RAN-specific positioning methods. Examples include Enhanced Observed Time Difference (EOTD) in RRLP and Idle Period DownLink-Observed Time Difference Of Arrival (IPDL-OTDOA). It should be noted that assistance data as described herein, can refer to GNSS assistance containing, but not limited to, navigation models, time assistance, reference location, atmosphere models, differential corrections, sensor assistance and acquisition assistance. The assistance data can also include e.g. position information, high-accuracy position information, multi-frequency multi-GNSS measurement data, computationally-generated measurements, sensor measurements, route information and waypoint information.

Common features exist in a majority, if not all of the protocols including, but not limited to those described above for delivering assistance data. However, when differences arise, a terminal's software must either have an adaptation layer for the relevant protocols or is limited to supporting only some, but not all of the protocols. Additionally, whenever a new cellular system (e.g., networks using worldwide interoperability for microwave access (WiMAX) technology or a standard such as the long term evolution (LTE) standard, a successor to GSM), is brought into use, a terminal must adapt to the specifics of that system/network as well.

In response to the above, the Open Mobile Alliance (OMA) has defined a user plane protocol referred to as secure user plane location (SUPL) 1.0. SUPL employs user plane data bearers for transferring location assistance information such as GPS assistance data, as described above, for carrying positioning technology-related protocols between terminal, e.g., a mobile communication device and its operating network. SUPL is intended to be an alternative and, at the same time, a complement to the existing standards based on signaling in the mobile network control plane. SUPL assumes that a mobile or other network can establish a data bearer connection between a terminal and some type of location server. The use of a user plane protocol is especially appealing in the case of Internet Protocol (IP) networks where the data bearer is by nature, available.

It should be noted that OMA SUPL utilizes existing control plane standards whenever possible, and it is envisioned that SUPL will be "extensible," thus enabling the use of additional positioning technologies so that different positioning technologies and/or systems utilize the same mechanism for transferring location assistance information.

Utilizing SUPL involves the wrapping of control plane protocol messages in order to move the signaling functionality of location assistance information from the control plane to the user plane, although SUPL is reliant upon the underlying system-specific control plane protocols. Moreover, the approach also moves the actual positioning from SUPL to the subprotocols. In order to complement the subprotocols, the SUPL also contains additions in the ULP (User Plane Location Protocol) layer to support, e.g., WLAN-based positioning.

In addition to the location protocols standardized in, for example, 3GPP and OMA, several proprietary assistance solutions have been developing in the market.

It is evident that, e.g., service providers or vendors, in the location business should utilize closed/proprietary solutions in order to gain an advantage and to differentiate themselves from competitors in the market place. The need for transmitting (e.g., delivering and/or transferring) non-standard assistance or location information currently implies developing a new proprietary positioning/location protocol from scratch. This is a result of the standardized solutions not offering a method(s) to complement content with vendor-specific items in a controlled manner. Developing a new protocol is time consuming, because in addition to protocol issues, authentication and security issues, for example, must be addressed. While the standardized solutions have already addressed these issues, their respective frameworks cannot be utilized. Moreover, from an implementation point-of-view, having a standardized solution (which typically must be supported in any case) as well as proprietary protocol results in the need to have two protocol stacks.

SUMMARY

Various embodiments allow for the introduction of proprietary extension support in a standardized user-plane location solution/protocol. In accordance with various embodiments, a method, apparatus, means, and/or a computer program product, embodied on a computer-readable medium, involves/performs the creation of a payload structure having at least one structure for at least one of requesting and transmitting at least one of assistance and location information in a user-plane location protocol. The method, apparatus, means, and/or computer-program product, embodied on a computer-readable medium further involves/performs the addition of at least one proprietary extension to the payload structure. In accordance with yet another embodiment, a data structure is provided. The data structure comprises a payload structure having at least one structure for at least one of requesting and transmitting the at least one of the assistance and location information in a user-plane location protocol, and at least one proprietary extension added to the payload structure.

Various embodiments prevent the fragmentation of location protocols, because all location-related information, both standard and proprietary, can be transferred within the same framework. Support for proprietary payloads can be introduced and updated by a software (SW) update to the terminal and serving server without the need for a standards cycle, and novel features can be added and tested at a substantially faster pace because the framework for the support functions is intact. Further still, changing dynamic data can be transported easily, where decoding instructions (such as, e.g., bit counts or scale factors) can be included in the proprietary payload in addition to the data.

These and other advantages and features of various embodiments of the present invention, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

Embodiments of the invention are described by referring to the attached drawings, in which.

DETAILED DESCRIPTION OF VARIOUS EMBODIMENTS

Various embodiments provide systems and methods of allowing for a vendor-defined payload in a standardized user-plane location solution/protocol. Thus, various embodiments allow for the introduction of proprietary extension support in one or more standardized solutions. In accordance with a first embodiment, a location payload consists of structures for transferring requests, assistance data, measurements and positioning instructions. Therefore, a proprietary extension is included in each of these structures so that, for example, proprietary assistance data can be requested in an appropriate structure. In accordance with another embodiment, a proprietary extension is introduced at the highest abstraction level. For example and in an actual implementation, a vendor can define that in the beginning of the proprietary payload, the proprietary extension is defined, whether the proprietary payload contains a request, assistance, etc.

Various embodiments allow for vendor-specific extensions, but may still rely on a standardized framework, where applicable. A proprietary payload can be added and utilized in addition to the actual data (e.g., assistance or measurements) in capability exchange and data requests. Additionally, vendor-specific payloads are distinguished by an ID, and support for vendor-specific items can be introduced by an SW-update to a terminal while keeping the standardized framework intact. Moreover, the SW update can be performed over the air (OTA) which makes the process user friendly and can even be performed automatically.

The proprietary payload cannot be embodied by a blank Information Element (IE) without any identification. That is, a minimum requirement should exist that allows vendors to distinguish between each other's proprietary extensions. This can be realized by, e.g., including a vendor ID at the beginning of an IE. The vendor IDs may be maintained by the appropriate standards body. In principle, the rest of the IE may then be left blank.

In accordance with one embodiment, a specific example applicable to Abstract Syntax Notation One (ASN.1) coding (a language for describing structured information generally intended to be conveyed over an interface or communication mode) is as follows.

```
ProprietaryExtension ::= SEQUENCE {
    vendorID        INTEGER(0..65535),
    payload         OCTET STRING (SIZE(0..65535))
    ...}
```

Alternatively, the framework may also include a placeholder for a message type. The interpretation of such a field can either be standardized or left for vendors to decide the most appropriate format.

```
ProprietaryExtension ::= SEQUENCE {
    vendorID        INTEGER(0..65535),
    messageType     INTEGER(0..65535),
    payload         OCTET STRING (SIZE(0..65535))
    ...}
```

Figure 1:
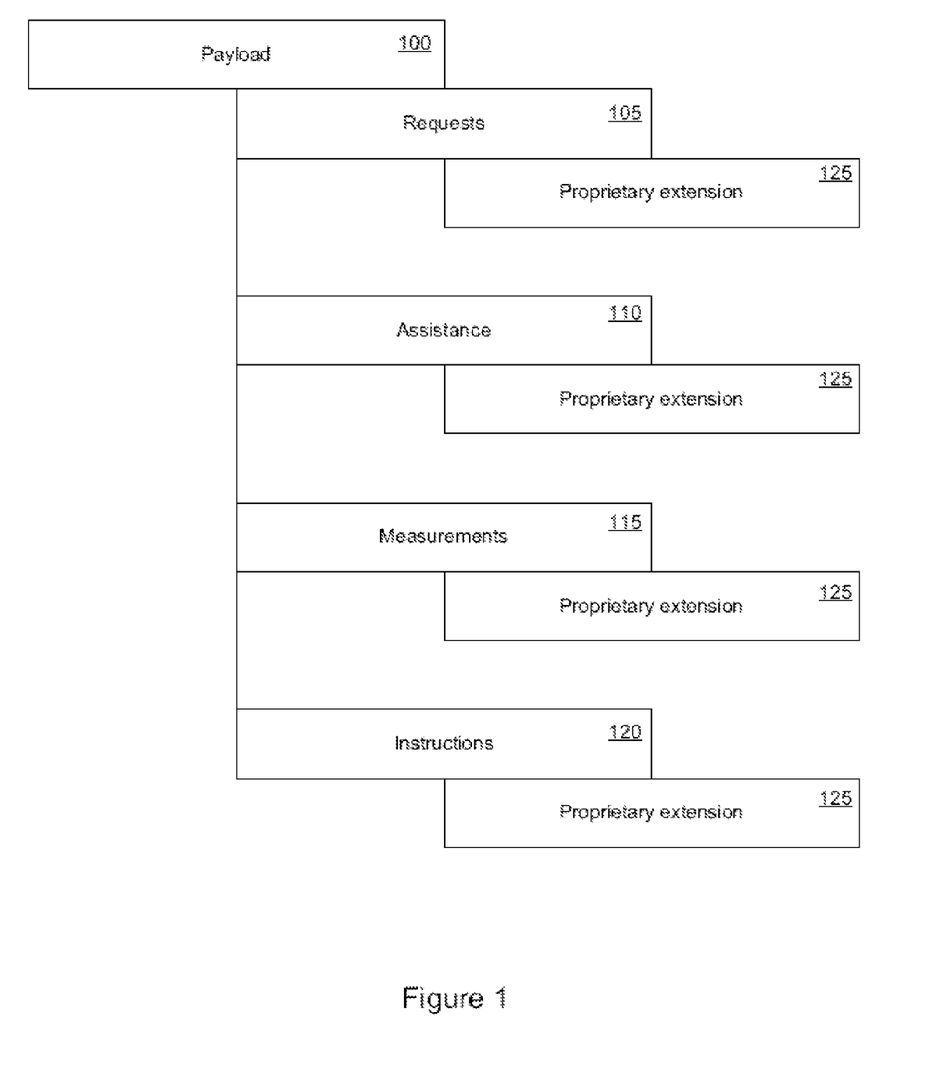
FIG. 1 illustrates a method for introducing support for a proprietary extension into a standardized user-plane location protocol/solution in accordance with one embodiment.
Figure 2:
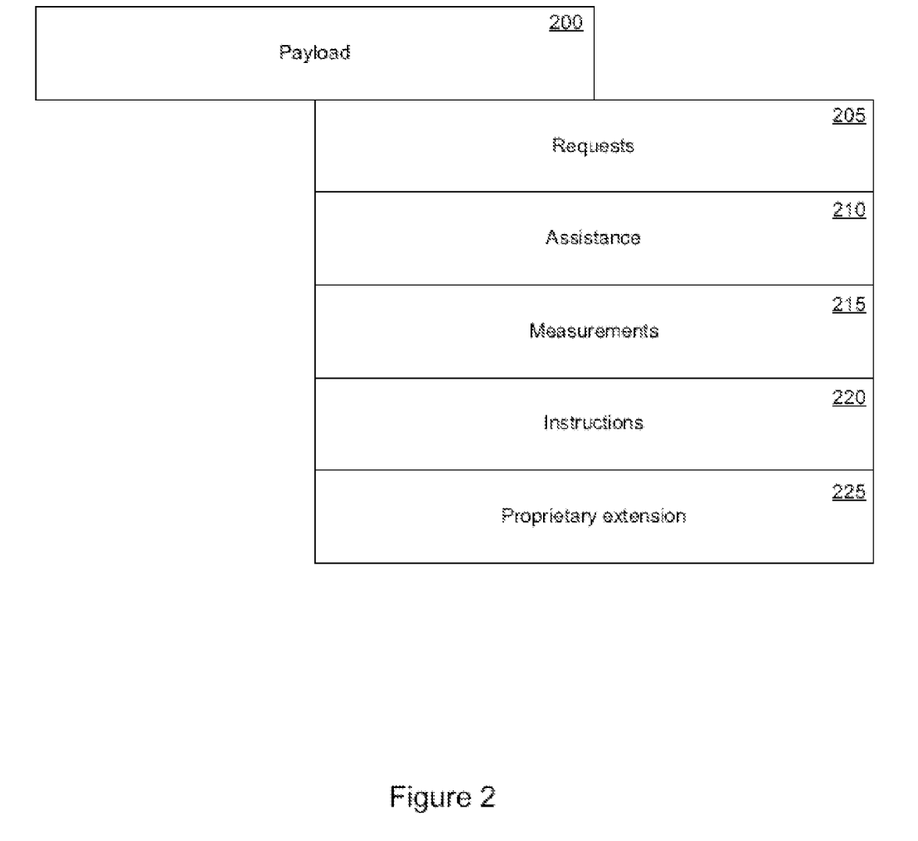
FIG. 2 illustrates another method for introducing support for a proprietary extension into a standardized user-plane location protocol/solution in accordance with a second embodiment.

FIGS. 1 and 2 illustrate exemplary methods of introducing support for a proprietary extension in a standardized solution in accordance with various embodiments. FIG. 1 illustrates an example, where as described above, the location payload 100 consists of structures for transferring requests (structure 105), assistance data (structure 110), measurements (structure 115), and positioning instructions (structure 120). A proprietary extension 125 is included in each of these structures so that, for example, proprietary assistance data can be requested in the appropriate structure.

FIG. 2 shows an alternative approach in accordance with another embodiment, where a proprietary extension 225 is introduced in the highest abstraction level. In actual implementation, a vendor can define that in the beginning of the proprietary payload 200, the proprietary extension 225 is defined, whether the proprietary payload 200 contains a request (structure 205), assistance data (structure 210), measurement data (structure 215), instruction information (structure 220), etc.

In accordance with yet another embodiment, another alternative method involves introducing a separate message for the proprietary extension.

Figure 3:
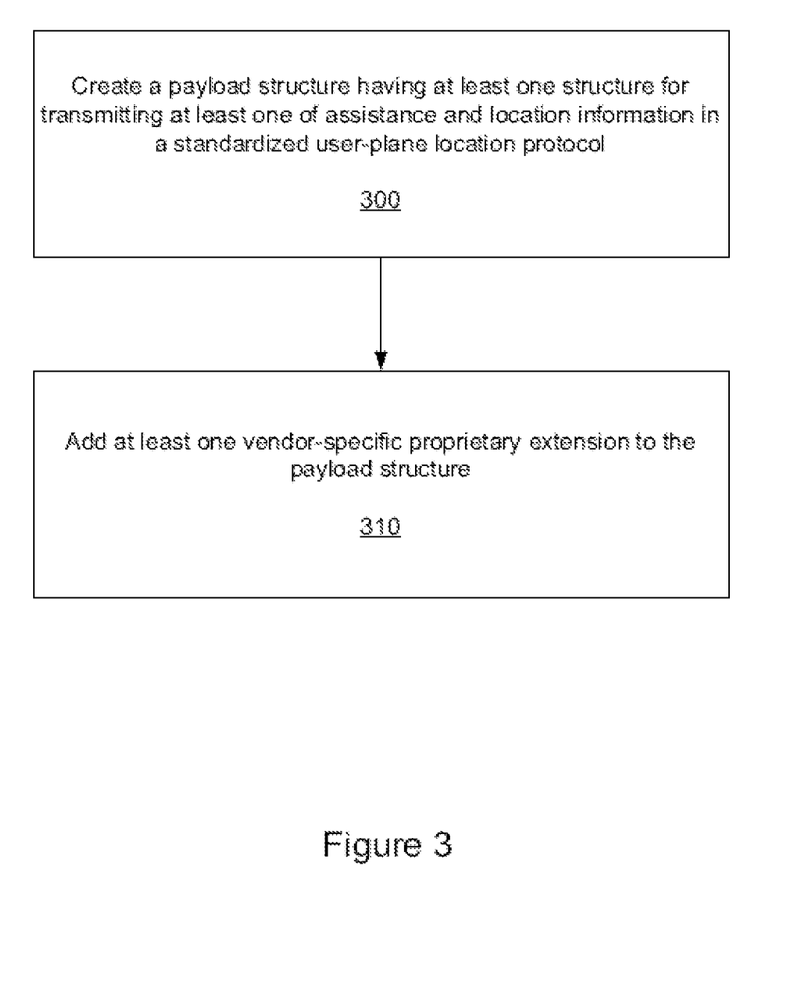
FIG. 3 is a flow chart illustrating various exemplary processes performed for including proprietary extension support in a standardized user-plane location solution/protocol in accordance with various embodiments.

FIG. 3 is a flow chart illustrating various processes performed for introducing proprietary extension support in a standardized user-plane location solution/protocol in accordance with various embodiments. At 300, a payload having at least one structure for transmitting at least one of assistance and location information in a standardized user-plane location protocol is created. At 310, at least one vendor-specific proprietary extension is added to the payload structure. It should be noted that the various processes described herein may be performed in differing order, and more or less processes may be performed in accordance with various embodiments.

Various embodiments prevent the fragmentation of location protocols, because all location-related information, both standard and proprietary, can be transferred within the same framework. Support for proprietary payloads can be introduced and updated by an SW update to the terminal and serving server without the need for a standards cycle, and novel features can be added and tested at a substantially faster pace because the framework for the support functions is intact. Further still, changing dynamic data can be transported easily, where decoding instructions (such as, e.g., bit counts or scale factors) can be included in the proprietary payload in addition to the data.

The introduction of an undefined block of data in the standard opens up various possibilities for vendor-specific additions/extensions. In addition, and as described above, the contents of the block of data may also be highly dynamic because the proprietary payload can contain, e.g., decoding instructions. Moreover, a vendor may also decide to populate the proprietary extension file with extensible markup language (XML) documents, objects, etc., thus providing additional flexibility to the content.

Figure 4:
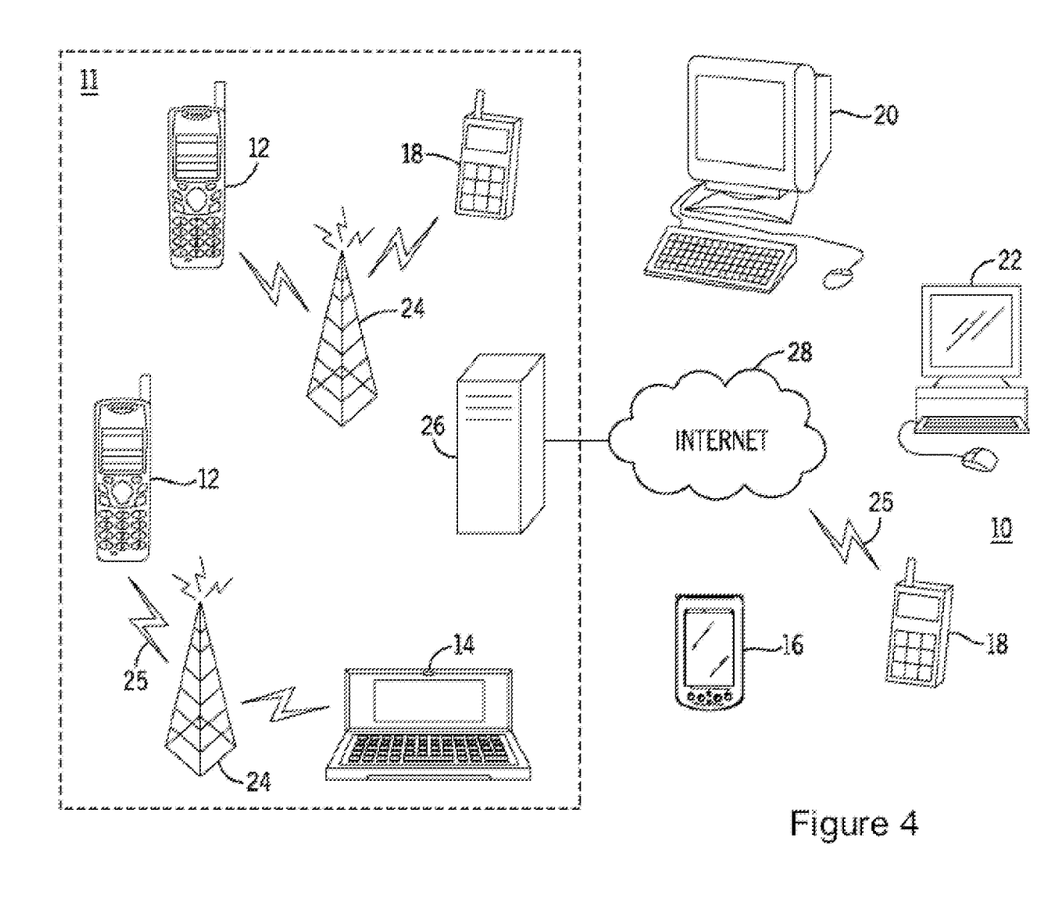
FIG. 4 is an overview diagram of a system within which various embodiments of the present invention may be implemented.

FIG. 4 shows a system 10 in which various embodiments of the present invention can be utilized, comprising multiple communication devices that can communicate through one or more networks. The system 10 may comprise any combination of wired or wireless networks including, but not limited to, a mobile telephone network, a wireless Local Area Network (LAN), a Bluetooth personal area network, an Ethernet LAN, a token ring LAN, a wide area network, the Internet, etc. The system 10 may include both wired and wireless communication devices.

For exemplification, the system 10 shown in FIG. 4 includes a mobile telephone network 11 and the Internet 28. Connectivity to the Internet 28 may include, but is not limited to, long range wireless connections, short range wireless connections, and various wired connections including, but not limited to, telephone lines, cable lines, power lines, and the like.

The exemplary communication devices of the system 10 may include, but are not limited to, an electronic device 12 in the form of a mobile telephone, a combination personal digital assistant (PDA) and mobile telephone 14, a PDA 16, an integrated messaging device (IMD) 18, a desktop computer 20, a notebook computer 22, etc. The communication devices may be stationary or mobile as when carried by an individual who is moving. The communication devices may also be located in a mode of transportation including, but not limited to, an automobile, a truck, a taxi, a bus, a train, a boat, an airplane, a bicycle, a motorcycle, etc. Some or all of the communication devices may send and receive calls and messages and communicate with service providers through a wireless connection 25 to a base station 24. The base station 24 may be connected to a network server 26 that allows communication between the mobile telephone network 11 and the Internet 28. The system 10 may include additional communication devices and communication devices of different types.

The communication devices may communicate using various transmission technologies including, but not limited to, Code Division Multiple Access (CDMA), Global System for Mobile Communications (GSM), Universal Mobile Telecommunications System (UMTS), Time Division Multiple Access (TDMA), Frequency Division Multiple Access (FDMA), Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, IEEE 802.16, LTE (3GPP Long-Term Evolution) etc. A communication device involved in implementing various embodiments of the present invention may communicate using various media including, but not limited to, radio, infrared, laser, cable connection, and the like.

Figure 5:
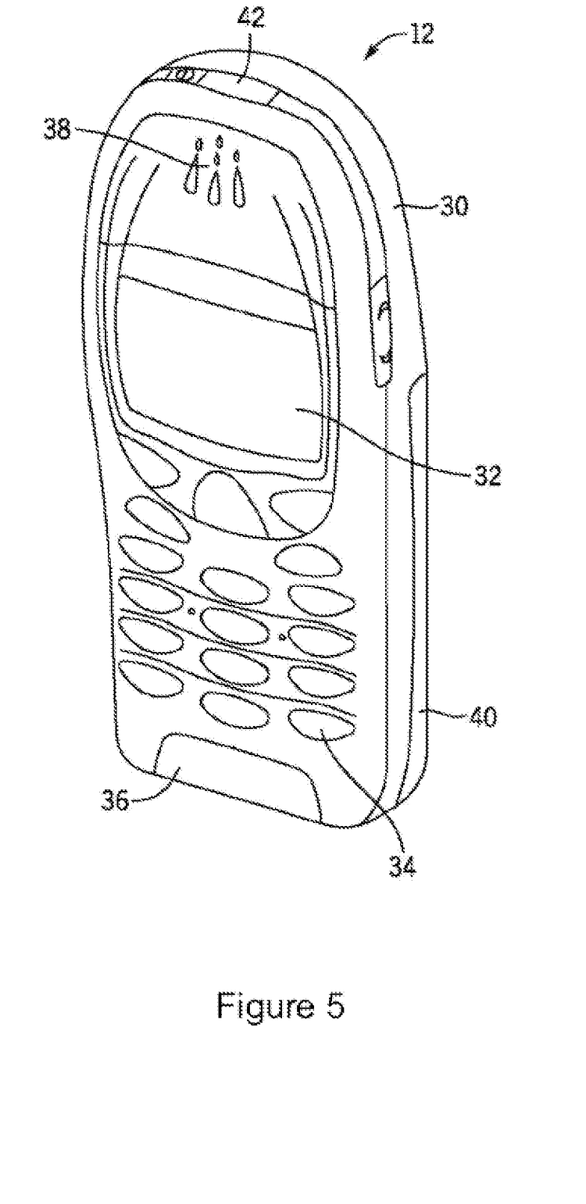
FIG. 5 is a perspective view of an electronic device that can be used in conjunction with the implementation of various embodiments of the present invention.
Figure 6:
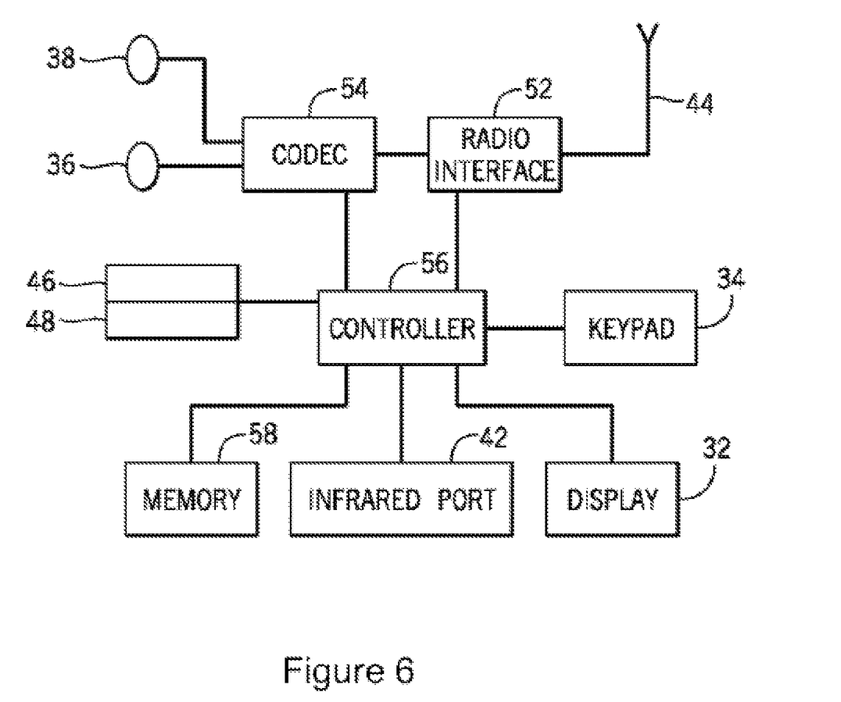
FIG. 6 is a schematic representation of the circuitry which may be included in the electronic device of FIG. 5.

FIGS. 5 and 6 show one representative electronic device 12 within which the present invention may be implemented. It should be understood, however, that the present invention is not intended to be limited to one particular type of device. The electronic device 12 of FIGS. 5 and 6 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment, a card reader 48, radio interface circuitry 52, codec circuitry 54, a controller 56 and a memory 58. Individual circuits and elements are all of a type well known in the art, for example in the Nokia range of mobile telephones.

Various embodiments described herein are described in the general context of method steps or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Various embodiments may be implemented in software, hardware, application logic or a combination of software, hardware and application logic. The software, application logic and/or hardware may reside, for example, on a chipset, a mobile device, a desktop, a laptop or a server. Software and web implementations of various embodiments can be accomplished with standard programming techniques with rule-based logic and other logic to accomplish various database searching steps or processes, correlation steps or processes, comparison steps or processes and decision steps or processes. Various embodiments may also be fully or partially implemented within network elements or modules. It should be noted that the words "component" and "module," as used herein and in the following claims, is intended to encompass implementations using one or more lines of software code, and/or hardware implementations, and/or equipment for receiving manual inputs.

Individual and specific structures described in the foregoing examples should be understood as constituting representative structure of means for performing specific functions described in the following the claims, although limitations in the claims should not be interpreted as constituting "means plus function" limitations in the event that the term "means" is not used therein. Additionally, the use of the term "step" in the foregoing description should not be used to construe any specific limitation in the claims as constituting a "step plus function" limitation. To the extent that individual references, including issued patents, patent applications, and non-patent publications, are described or otherwise mentioned herein, such references are not intended and should not be interpreted as limiting the scope of the following claims.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. The features of the embodiments described herein may be combined in all possible combinations of methods, apparatus, modules, systems, and computer program products.

What is claimed is:

1. A method of providing location services by a location server, comprising:
   receiving, by the location server, from a mobile device a request for location assistance information, wherein the request for location assistance information uses a payload structure in a standardized user plane location protocol, wherein the payload structure has at least one structure for at least one of requests, assistance data, measurements, positioning instructions, or combinations thereof, wherein the payload structure comprises at least one proprietary extension structure, wherein the at least one proprietary extension structure allows for transmitting of proprietary assistance data and is added such that all location information in the payload structure, including the proprietary assistance data, is within a single framework in the user-plane location protocol, and wherein the proprietary extension structure is configured to accommodate transmitting of proprietary assistance data originating from one or more of a plurality of vendors, wherein accommodating transmitting of proprietary assistance data from one or more of a plurality of vendors comprises accommodating assistance data from different vendors, wherein the proprietary assistance data is vendor-specific assistance or location information; and
   in response to the request for assistance information from the mobile device transmitting the assistance information to the mobile device using the payload structure comprising the proprietary extension structure.

2. An apparatus, comprising:
   at least one processor; and
   at least one memory including computer program code,
   the at least one memory and the computer program code configured to, with the at least one processor, cause the apparatus to perform at least the following:
   receiving, by a location server, from a mobile device a request for location assistance information, wherein the request for location assistance information uses a payload structure in a standardized user-plane location protocol, wherein the payload structure has at least one structure for at least one of requests, assistance data, measurements, positioning, instructions, or combinations thereof, wherein the payload structure comprises proprietary extension structure, wherein the at least one proprietary extension structure allows for transmitting of proprietary assistance data and is added such that all location information in the payload structure, including the proprietary assistance data, is within a single framework in a user-plane location protocol, and wherein the proprietary extension structure is configured to accommodate transmitting of proprietary location assistance data originating from one or more of a plurality of vendors, wherein accommodating transmitting of proprietary assistance data from one or more of a plurality of vendors comprises accommodating assistance data from different vendors, wherein the proprietary assistance data is vendor-specific assistance or location information; and
   in response to the request for assistance information from the mobile device, transmitting the assistance information to the mobile device using the payload structure comprising the proprietary extension structure.

3. A method of requesting location services from a location server, comprising:
   transmitting, by a mobile terminal, to the location server a request for location assistance information, wherein the request for location assistance information uses a payload structure in a standardized user plane location protocol, wherein the payload structure has at least one structure for at least one of requests, assistance data, measurements, positioning instructions, or combinations thereof, wherein the payload structure comprises at least one proprietary extension structure, wherein the at least one proprietary extension structure allows for requesting of proprietary assistance data and is added such that all location information in the payload structure, including the proprietary assistance data, is within a single framework in the user-plane location protocol, and wherein the proprietary extension structure is configured to accommodate requesting of proprietary assistance data originating from one or more of a plurality of vendors, wherein accommodating requesting of proprietary assistance data from one or more of a plurality of vendors comprises accommodating assistance data from different vendors, wherein the proprietary assistance data is vendor-specific assistance or location information; and
   receiving, by the mobile terminal, from the location server in response to the request, assistance information transmitted from the location server to the mobile terminal using the payload structure comprising the proprietary extension structure.

4. The method of claim 3, wherein the at least one proprietary extension structure comprises an information element having a vendor-specific payload.

5. The method of claim 4, wherein the vendor-specific payload is identified by a vendor identifier.

6. The method of claim 4, wherein the at least one proprietary extension structure comprises more than one vendor-specific payload, the vendor-specific payloads being distinguished by vendor identifiers.

7. The method of claim 4, wherein the vendor-specific payload comprises decoding instructions in addition to data.

8. The method of claim 3, wherein the at least one proprietary extension structure comprises an information element having a vendor identifier and at least one of a placeholder for a message type and an assistance data identifier.

9. The method of claim 8, wherein the at least one proprietary extension structure comprises more than one vendor-specific payload, the vendor-specific payloads being distinguished by vendor identifiers and either the message type or the assistance data identifier.

10. The method of claim 8, wherein the message type refers to a type of the at least one of the requests, assistance data, measurements, positioning instructions, or combinations thereof to be transmitted via the user-plane location protocol.

11. The method of claim 8, wherein interpretation of the placeholder for the message type is specified by a vendor.

12. The method of claim 8, wherein the vendor identifier and either the assistance data identifier or the message type are indicative of a particular service provider and at least one of a navigation model, time assistance, reference location, an atmosphere model, a differential correction, sensor assistance, acquisition assistance, position information, high-accuracy position information, multi-frequency multi-Global Navigation Satellite System measurement data, global positioning system-related data, computationally-generated measurements, sensor measurements, route information, and waypoint information.

13. The method of claim 3, wherein the addition of the at least one proprietary extension structure occurs at each of the at least one structure for transmitting the at least one of the requests, assistance data, measurements, positioning instructions, or combinations thereof.

14. An apparatus comprising:
at least one processor;
memory storing a program of instructions;
wherein the memory storing the program of instructions is configured, with the at least one processor, to cause the apparatus to perform at least the following:

transmitting, by a mobile terminal, location server a request for location assistance information, wherein the request for location assistance information uses a payload structure in a standardized user plane location protocol, wherein the payload structure has at least one structure for at least one of requests, assistance data, measurements, positioning instructions, or combinations thereof, wherein the payload structure comprises at least one proprietary extension structure, wherein the at least one proprietary extension structure allows for requesting of proprietary assistance data and is added such that all location information in the payload structure, including the proprietary assistance data, is within a single framework in the user-plane location protocol, and wherein the proprietary extension structure is configured to accommodate requesting of proprietary assistance data originating from one or more of a plurality of vendors, wherein accommodating requesting of proprietary assistance data from one or more of a plurality of vendors comprises accommodating assistance data from different vendors, wherein the proprietary assistance data is vendor-specific assistance or location information; and receiving, by the mobile terminal, from the location server in response to the request, assistance information transmitted from the location server to the mobile terminal using the payload structure comprising the proprietary extension structure.

15. The apparatus of claim 14, wherein the at least one proprietary extension structure comprises an information element having a vendor-specific payload.

16. The apparatus of claim 15, wherein the vendor-specific payload is identified by a vendor identifier.

17. The apparatus of claim 15, wherein the at least one proprietary extension structure comprises more than one vendor-specific payload, the vendor-specific payloads being distinguished by vendor identifiers.

18. The apparatus of claim 14, wherein the at least one proprietary extension structure comprises an information element having a vendor identifier and at least one of a placeholder for a message type and an assistance data identifier.

19. The apparatus of claim 18, wherein the at least one proprietary extension structure comprises more than one vendor-specific payload, the vendor-specific payloads being distinguished by vendor identifiers and either the message type or the assistance data identifier.

* * * * *